Oct. 19, 1965 W. R. HARPER, JR., ETAL 3,213,240

DAMPER MEANS FOR USE WITH SNAP ACTING ELEMENT

Filed Jan. 22, 1962

Inventors:
Walter R. Harper, Jr.,
Curtis F. Kruger,
Richard W. Strachan,
by Harold Levine
Att'y.

United States Patent Office 3,213,240
Patented Oct. 19, 1965

3,213,240
DAMPER MEANS FOR USE WITH SNAP ACTING ELEMENT

Walter R. Harper, Jr., Barrington, R.I., and Curtis F. Kruger, Attleboro, and Richard W. Strachan, Taunton, Mass., assignors to Texas Instruments Incorporated, Dallas, Tex., a corporation of Delaware
Filed Jan. 22, 1962, Ser. No. 167,584
1 Claim. (Cl. 200—113)

This invention relates to thermally responsive electrical switches, and more particularly to thermally responsive electrical switches of a type including a dished snap-acting thermostatic disc as the thermostatic element thereof.

The invention is particularly applicable to (though not limited to) three-phase type thermally responsive electrical switches useful as a protector for a three-phase alternating current motor. The protector essentially comprises a base, a snap-acting thermostatic element, more particularly a dished snap-acting thermostatic disc having a deformed portion therein responsible for its snap action, and means for supporting the disc at its center, on the base. The disc has three contacts on one side thereof adjacent its periphery engageable with three fixed contacts on the base. The disc upon reaching a predetermined temperature will snap from one position of concavity to an opposite position of concavity in a manner well-known in the art.

In the past problems have been encountered in some applications, in that the disc in snapping and reversing its curvature from the contacts-closed to the contacts-open position will many times be carried by its momentum to move beyond its stable contacts-open configuration of concavity and then move in the opposite direction beyond its stable contacts-open configuration of concavity. The disc (and particularly the peripheral contact carrying portions thereof) will continue this vibratory or oscillatory movement until the disc reaches an at-rest stable contacts-open configuration of concavity. This rebound or oscillation of the disc (the oscillation generally taking place without a snap-acting reversal in curvature of the disc) in many cases is of such a magnitude as to momentarily reclose the contacts or to so closely approach reclosing the contacts as to undesirably cause restriking or propagation of arcs between the contacts, which can deleteriously effect the contact life and the operational life of the electrical switch. Another drawback of such disc oscillation is that in many cases permanent stress alterations are created in the disc which tend to deleteriously effect the calibration of the disc and also to shorten the operational life of the switch.

Another problem which is frequently encountered, particularly in three-phase disc operated thermally responsive switches, in that the disc upon snapping from the contacts-closed toward the contacts-open position may not separate or open all of the pairs of the engaged contacts, for example one or more pairs of engaged contacts may remain closed because of sticking or minute welding therebetween.

Accordingly, among the several objects of this invention may be noted the provision of a construction particularly suitable for a motor protector of the class described (though not limited to such use), which obviates or at least minimizes the problems mentioned above; and the provision of a construction which is simple in construction, economical to manufacture and assemble and reliable in operation.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which one of the various possible embodiments of the invention is illustrated:

Similar reference characters indicate corresponding parts throughout the several views of the drawings.

Figures 1, 2, 3:
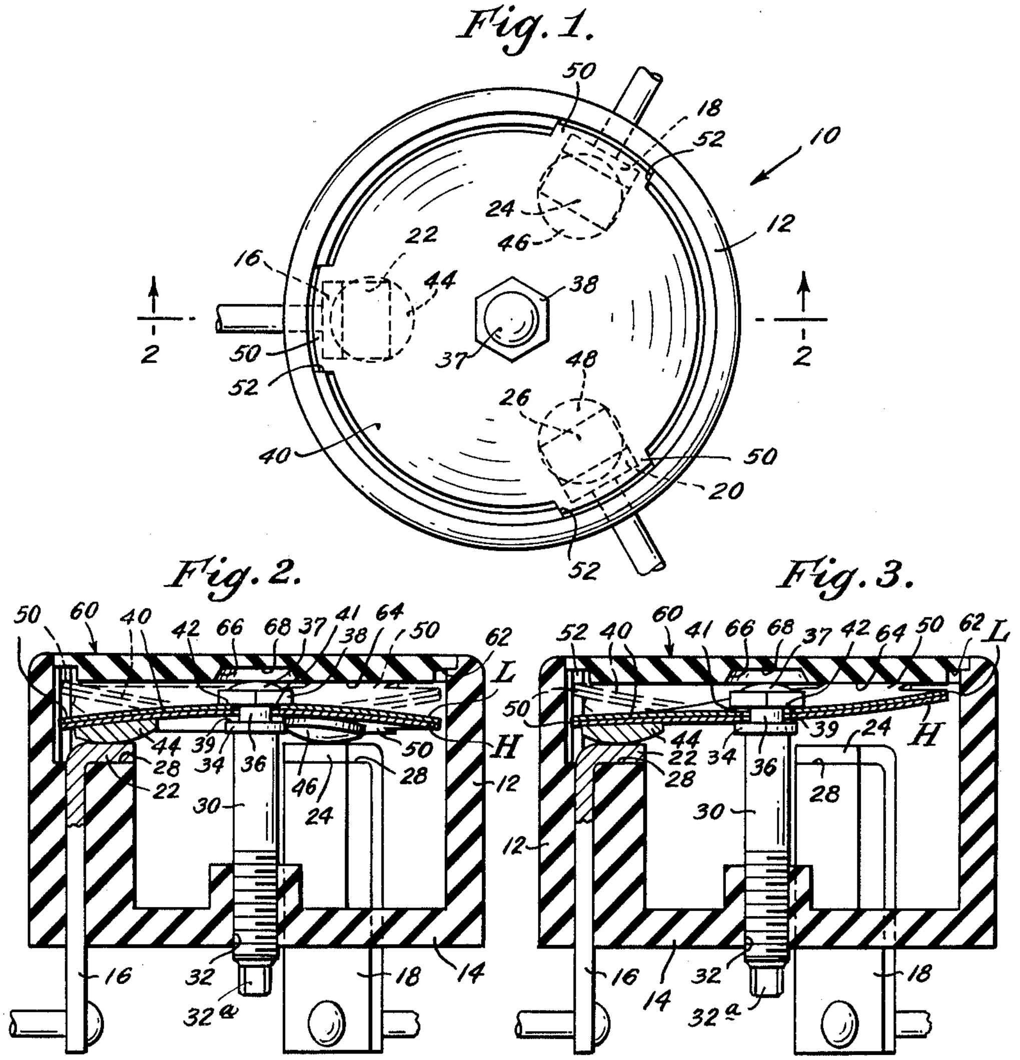
FIG. 1 is a plan view of an embodiment of a motor protector according to this invention with a cover member forming a part of this invention omitted for clarity of illustration.
FIG. 2 is a vertical section taken on line 2—2 of FIG. 1 showing the cover member and the dished snap-acting thermostatic disc of the protector in a solid-line, circuit-closing position.
FIG. 3 is a view similar to FIG. 2 illustrating a condition where the dished snap-acting thermostatic disc has snapped toward a contacts-open position but with one pair of contacts remaining engaged as shown in solid lines.
Figure 4:
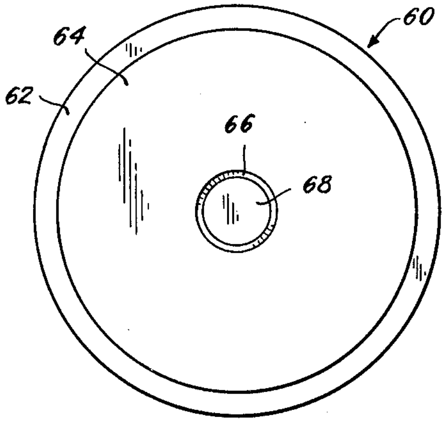
FIG. 4 is a bottom plan view of a cover member for the switch shown in FIG. 1.

Dimensions of certain of the parts as shown in the drawings have been modified and/or exaggerated for the purposes of clarity of illustration.

Referring to the drawings, a thermostatic switch generally designated by numeral 10, constructed in accordance with this invention is shown to comprise a cup-shaped housing 12 open at one end and including a base 14 defining another end thereof. Cup-shaped housing 12 is formed of electrically insulating material such as a ceramic or a phenolic thermosetting resinous material. Fixed in the base 14 of cup-shaped housing 12 are three electrically conductive terminals respectively designated at 16, 18 and 20, which extend up into the cup from base 14 as shown. The upper end of each of terminals 16, 18 and 20 is bent over to respectively provide electrical contacts 22, 24 and 26. The terminals 16, 18 and 20 and their respective upper contact forming ends 22, 24 and 26 are spaced at approximately 120° intervals around the cup shaped housing 12 as shown in FIG. 1. The contact forming ends 22, 24 and 26 respectively of the terminals 16, 18 and 20 bear on shoulders 28 formed in the cup 12. The lower ends of the terminals 16, 18 and 20 project outwardly from the bottom of the base 14 of the cup 12 for electrical connection to a circuit, for example for the phase windings of a three-phase alternating current motor.

A threaded post or screw 30 is threaded in an opening 32 in the center of base 14 of the cup 12 as shown. Threaded post 30 extends up toward the top of the cup as shown. Adjacent its upper end, the screw is formed with the flange 34 and a reduced diameter cylindrical stud portion 36 extending above the flange 34 as best seen in FIGS. 2 and 3. Threaded mounting post 30 serves as a means for supporting a dished snap-acting thermostatic disc 40 which may for example be a bimetallic disc of the type described in the Vaughan et al. U.S. Patent No. 2,585,704 or the Vaughan et al. U.S. Patent No. 2,317,-831. Disc 40 has a centrally located aperture or hole 42 (see FIGS. 2 and 3) having a diameter slightly larger than the diameter of stud portion 36. Stud 36 extends loosely through aperture 42 and the disc bears on the shoulder 39 provided by the flange 34. The disc 40 may be mounted on the center post or screw 30 with its low expansion side L up and its high expansion side H down. In the construction illustrated in FIGS. 1–3 the disc 40 normally occupies, at given temperatures (e.g., normal room temperature), the upwardly arched position concave with respect to the base 14 in which it is shown in solid lines in FIG. 2. Disc 40, as illustrated in FIGS. 2 and 3, will upon reaching a predetermined increased temperature, snap from the solid line position to the contacts-open position of opposite concavity shown in dashed lines in FIG. 2. It will be observed that the disc 40 is not manually resettable due to the fixed cover 60. As set forth in the above first mentioned patent to Vaughan et al., the disc 40 is calibrated for automatic resetting and will snap back to circuit closing position upon cooling. It will be understood that if desired the high and low expansion sides of the disc 40, could be reversed from that shown in FIGS. 2 and 3 so that disc 40 would snap from the contacts-closed to the contacts-open condition upon a predetermined drop in temperature.

A washer 38 is applied to the reduced diameter end portion 36 of the screw 30 and held down by riveting over the free end of portion 36 indicated as at 37 in FIGS. 2 and 3. Washer 38 projects out from the stud 36 and constitutes a shoulder 41 opposed to the shoulder 39. The snap-acting disc 40 is held in assembly with the spacing between the shoulders 39 and 41 being such that the annular central portion of disc 40 surrounding the central hole 42 is relatively free to flex and snap between the upwardly arched configuration concave with respect to the base in which it appears in solid lines in FIG. 2, and the downwardly arched configuration convex with respect to the base 14 in which it appears in broken lines in FIG. 2. Secured as by welding, to the bottom face (for example, the high expansion side H) of the disc, are three contact buttons 44, 46 and 48 which are respectively engageable with fixed contacts 22, 24 and 26 when the disc is in the upwardly arched position shown in solid lines in FIG. 2. Disc 40 is a three-phase type disc and is formed with three projecting extensions or ears 50 adjacent the peripheral contact carrying portions of disc 40 as shown in FIG. 1. Ears 50 are loosely movable in grooves 52 provided in the annular wall of cup-shaped housing 12 to maintain the contact buttons 44, 46 and 48 respectively in register with stationary or fixed contacts 22, 24 and 26, without restraining the disc from snapping.

The lower end of screw 30 which projects exteriorly of the housing 12 from the bottom of base 14 (as seen in FIG. 2) is provided with a portion **32*a* engageable by a wrench or suitable tool for turning the screw 30 to adjust it up or down so as to enable the switch to be calibrated, i.e., to set the disc 40 to snap open upon reaching a predetermined temperature. The screw 30 can turn in the disc 40 for this purpose. The adjustment of the screw also provides appropriate pressure between the disc contacts 44, 46 and 48, and their respective fixed contacts 22, 24 and 26, when the disc is in its upwardly arched solid line FIG. 2 position. The disc 40 is of the type which is self-heated by current flowing therethrough due to its electrical resistance, and it is also subject to extraneous heating by the surrounding ambient. For example, when switch 10 is used as a motor protector, upon the occurrence of a current overload in the motor or excessive extraneous heat, the temperature of the disc, upon rising to its preset snapping temperature, will snap from the upwardly arched closed position shown in solid lines in FIG. 2 to the downwardly arched position illustrated in broken lines in FIG. 2. In many cases disc 40, in snapping from the solid line to the dashed line position in FIG. 2, will vibrate or oscillate for a time until the disc comes to rest at the stable contacts-open downwardly arched configuration. Means are provided according to the present invention for dampening such oscillation to obviate or at least minimize the problems created thereby as described above. The abutment means is generally designated at numeral 60 and in the drawing takes the form of a damper cover member interfitting with and secured to cup-shaped housing 12 as at flange 62. Damper cover member 60 has an annular disc-like ring or washer 64 which may be formed of electrically insulating material and projects into cup 12 and is positioned adjacent the disc 40 at a side opposite that to which movable contacts 44, 46 and 48 are connected (see FIGS. 2 and 3). The annular ring type abutment 64 provided by the damper cover 60 includes a centrally located recessed portion 68 having beveled sides as at 66 to accommodate the riveted or headed over portion 37 of stem 36. The exposed interior surface of annular abutment ring 64 is positioned with respect to disc 40 so as to engage the eared contact-carrying portions of the disc to limit travel of the disc when the latter snaps from the contacts-closed to the contacts-open position shown in FIG. 2, to restrict overtravel of the disc (i.e., travel of the disc beyond its at-rest stable contacts-open position) and dampen disc oscillation. Without the restraining abutment 64, the peripheral portions of disc 40 would travel beyond its stable at-rest contacts-open position due to inertia forces and momentum in the disc upon snapping. Since the disc 40 is a snap-acting spring member, its action also carries it below the at-rest contacts-open position after overtravel has occurred before the disc assumes its at-rest stable contacts-open configuration, with oscillatory disc movement taking place until the disc assumes the at-rest position. Referring now to FIG. 3, it will be seen that the annular abutment ring 64 serves yet another function. When the disc 40 snaps toward the contacts-open position there are internal spring forces in the disc 40 acting to urge the disc into the FIG. 2 dashed line dished configuration. After such snapping if one pair of contacts (e.g., 44, 22 as shown in FIG. 3) remain engaged the disc will still be urged to assume the FIG. 2 dashed line dished configuration but in many cases this force is not adequate to break apart the contacts which may be held together by minute welds. In absence of the abutment 64, if contacts 44 and 22 remain closed when the other two sets of contacts open on snapping of the disc, the disc 40 would assume an at-rest stable dished configuration in a tilted orientation about the stud 36. The abutment 64 prevents the disc from assuming an at-rest dished configuration until all of the contacts are open through its engagement with eared portions 50 adjacent the movable contacts which have been disengaged. Thus, if after snapping of disc 40, toward the contacts-open position, contacts 44 and 22 remain in engagement, for example, due to minute welds therebetween, disc 40 will assume the solid-line configuration shown in FIG. 3, in which eared portions 50 adjacent the movable contacts which have become disengaged, bear against abutment 64 and create a fulcruming action about post 30 to apply a contact separating force or moment tending to separate contacts 44 and 22 and break apart any welds therebetween, to free contact 44** for movement to the dashed line FIG. 3 position.

Another advantage of the damper cover 60, of the present invention, is that the abutment means 64 cooperates with disc 40 to render switch 10 more vibration resistant and insensitive to position orientation. Ears 50 in engaging the abutment 64, when disc 40 snaps to the dashed lines FIG. 2 contacts-open position, provides a leveling action for the disc, thereby obviating or at least minimizing any tendency of the disc to tilt about the reduced diameter post 36 to move one or more of the movable contacts toward their respective stationary contacts. In the absence of the damper cover 60 such disc tilting movement might take place due to vibration or position orientation of the switch 10 and be of such a magnitude as to cause restrike or arc propagation, particularly where there is excessive spacing between flanges 34 and 38. Another advantage of the damper cover 60 is that greater tolerances in the spacing between the flanges 34 and 38 are permitted.

In view of the above, it will be seen that the several objects of the invention are achieved, and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claim shall cover all such equivalent variations as come within the true spirit and scope of the invention.

We claim:

An automatically resettable thermally responsive switch comprising a base, a plurality of spaced contacts carried on said base, a snap acting thermostatic element calibrated to automatically reset upon a predetermined temperature change adapted to snap from a first to a second position on reaching a predetermined temperature, and means for supporting said element on said base, said element on one side thereof having a plurality of spaced portions adjacent the periphery thereof each carrying an electrical contact respectively engageable with a contact of said first named plurality of contacts when said element is in said first position, said switch including abutment means positioned adjacent the other side of said element between said second position and a third position to which said snap acting element would travel if undamped beyond said second position in snapping from said first position to said second position, in substantially fixed relationship with respect to said base, for engagement with said contact carrying portions of said element to dampen oscillatory movement of said element when the latter snaps from said first to said second position.

References Cited by the Examiner

UNITED STATES PATENTS

| | | | |
|---|---|---|---|
| 2,434,984 | 1/48 | Bolesky et al. | 200—138 |
| 2,596,171 | 5/52 | Rabinow | 200—138 X |
| 2,685,014 | 7/54 | Mang | 200—138 |
| 2,967,920 | 1/60 | Harper et al. | 200—113.7 |

FOREIGN PATENTS

| | | |
|---|---|---|
| 536,157 | 1/57 | Canada. |
| 583,658 | 12/46 | Great Britain. |
| 691,167 | 5/53 | Great Britain. |

BERNARD A. GILHEANY, *Primary Examiner.*